United States Patent [19]
Robinson

[11] 3,851,902
[45] Dec. 3, 1974

[54] DISCONNECTIBLE PIPE UNION

[76] Inventor: Klas Robert William Robinson, Lovangsvagen 37, 183 30 Taby, Sweden

[22] Filed: Mar. 18, 1974

[21] Appl. No.: 451,789

Related U.S. Application Data

[63] Continuation of Ser. No. 289,527, Oct. 18, 1972, abandoned, which is a continuation-in-part of Ser. No. 46,252, June 15, 1970, abandoned.

[30] Foreign Application Priority Data
Nov. 11, 1971   Sweden.............................. 14472/71
May 13, 1970   Sweden.............................. 6545/70

[52] U.S. Cl............. 285/334.2, 285/334.4, 285/351, 285/367, 285/371
[51] Int. Cl.............................................. F16l 21/06
[58] Field of Search .......... 285/351, 352, 367, 366, 285/365, DIG. 12, DIG. 10, 334.3, 334.2, 334.5, 334.4, 371, 398, 334.1

[56] References Cited
UNITED STATES PATENTS

| | | | |
|---|---|---|---|
| 106,122 | 8/1870 | Clark .............................. | 285/334.2 |
| 2,340,732 | 2/1944 | Bruno .......................... | 285/334.4 X |
| 2,635,900 | 4/1953 | Mayo et al..................... | 285/367 X |
| 3,189,371 | 6/1965 | Swan............................ | 285/DIG. 12 |
| 3,284,106 | 11/1966 | McIntosh et al................ | 285/352 X |
| 3,325,176 | 6/1967 | Latham et al................ | 285/334.2 X |
| 3,679,237 | 7/1972 | DeAngelis........................ | 285/371 X |

FOREIGN PATENTS OR APPLICATIONS

| | | | |
|---|---|---|---|
| 292,513 | 11/1953 | Switzerland...................... | 285/334.4 |
| 1,075,622 | 7/1967 | Great Britain.................... | 285/334.3 |
| 1,473,759 | 2/1967 | France............................... | 285/367 |
| 793,309 | 4/1958 | Great Britain.................... | 285/334.2 |
| 1,550,028 | 11/1969 | Germany............................ | 285/367 |

*Primary Examiner*—Thomas F. Callaghan
*Attorney, Agent, or Firm*—Woodhams, Blanchard and Flynn

[57] ABSTRACT

There is provided a novel type of pipe unions for connecting the meeting ends of two pipes, comprising two flared collars mounted or welded one on each pipe end to form, when the collars are placed confronting one another, external and internal converging surfaces, the external surfaces being encompassed and engaged by a segmented clamping ring which is adapted in knownmanner to urge the collars towards each other. A stiff but resilient sealing ring is inserted between the collars and placed between the sloping internal surfaces of the collars to be engaged thereby and subjected, by camming action, to a radial elastic deformation while sealing the joint. Means are provided for additional sealing of the joint and/or facilitating mounting of the sealing ring where the available gap between the unconnected collars is narrow.

4 Claims, 9 Drawing Figures

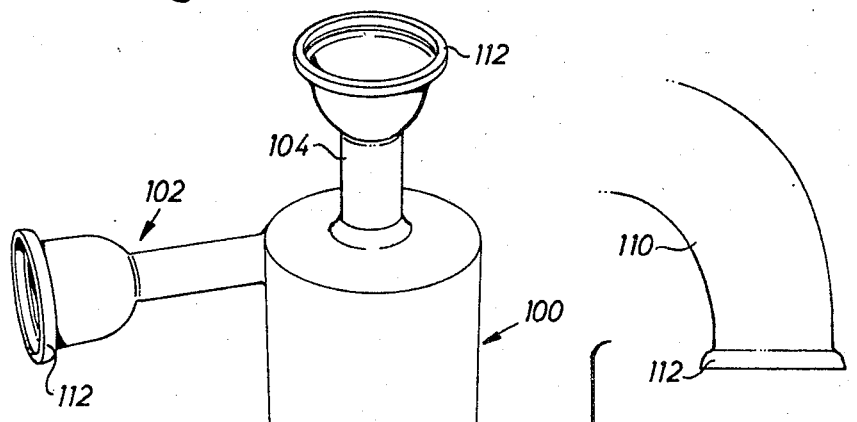
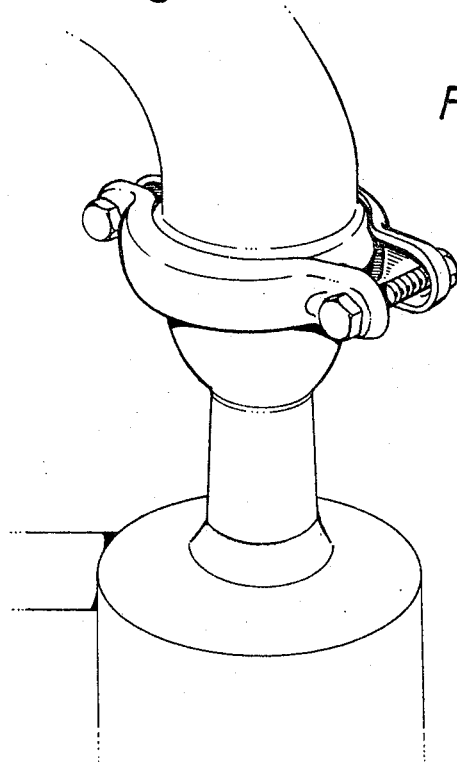
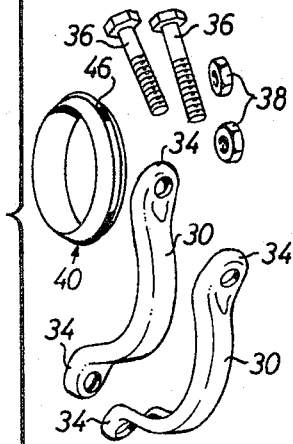
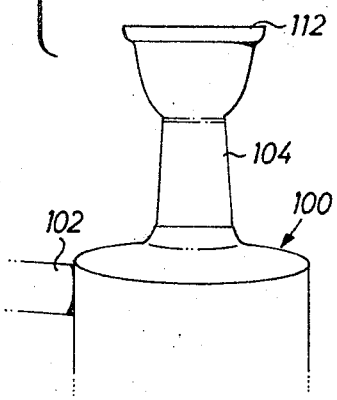

DISCONNECTIBLE PIPE UNION

The present invention relates to means for connecting together conduits and the like and more particularly to disconnectible pipe unions or couplings of the type which are indirectly held together and tightened by screws. The invention is an improvement of the arrangement described in my earlier U.S. Pat. application Ser. No. 46,252.

As mentioned in my earlier patent application, there are several pipe couplings or unions of the clamp type known to the art, wherein connection is secured by means of a segmented clamping ring, which is thus divided into two or more part annular sections. The inner surface of the clamping ring presents a groove having a straight bottom surface and sloping sidewalls, so as to present a frusto-conical configuration in cross section. The ends of the conduits or pipes to be joined together are provided with flanges which are chamfered or bevelled on their external surfaces so as to present an inclined surface corresponding to the inclination of the groove walls in the clamping ring, thereby enabling the flanges to fit into the groove and engage the walls thereof. The part annular sections of the clamping ring, hereinafter referred to as clamp members, are provided with lugs arranged to receive screws or bolts by means of which the clamp members can be tightened around the pipe end flanges, a wedging action then being exerted on the flanges to draw them towards each other. A suitable form of gasket is interposed between the flanges, to provide a mechanically rigid and sealed joint. In order that pipe unions of this construction can operate efficiently, however, it is necessary that the ends of the pipes to be connected are relatively well aligned with each other, in order to prevent the occurrence of strong deviations in the flow passage provided thereby or the occurrence of permanent stresses in the joint when the clamp members are tightened. The pipe union of my earlier patent application was intended to simplify such couplings and to render them less expensive than the couplings of conventional design. A further object of my earlier pipe union was to render the work involved in connecting pipes together less sensitive to misalignment of the pipe ends being joined, by using an annular seal or sealing ring capable of self-adjustment, i.e., to sealingly adjust its position in the joint.

The object of the present invention is to provide a disconnectable pipe union of the aforementioned type which is further improved on my earlier construction, primarily in two respects. Firstly, my improved pipe union is intended to improve the sealing ability of such union in both directions, that is to say, when the pressure in the pipe is higher than the pressure externally of the pipe as well as vice versa, when the pressure in the pipe is lower than the ambient pressure, and thus where leakage from the surrounding into the pipe must be prevented.

Secondly, a further object of the present invention is to provide an improved pipe union which is relatively easy to assemble in position even when the ends of the pipes to be connected are in close proximity to each other and the pipes form part of a fixed system of pipes, rendering it difficult to move the pipes apart to insert therebetween the annular seal component of the union. These objects are obtained and the aforementioned disadvantages associated with known pipe connecting clamps are eliminated by means of the pipe union according to the present invention.

The invention will now be described with reference to a number of embodiments thereof, illustrated in the accompanying drawings, in which FIG. 1 is a side view, partly in longitudinal section, of a disconnectible pipe union substantially constructed as proposed in my earlier U.S. Pat. application Ser. No. 46252;

Figure 3:
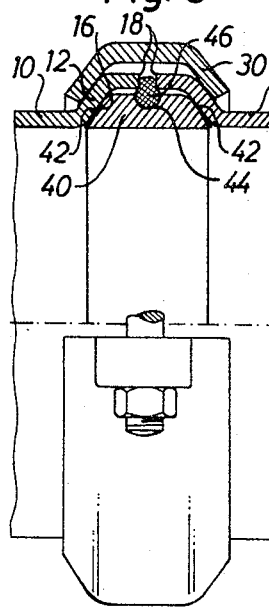
FIG. 3 is a longitudinal sectional view through a first embodiment of the union according to the present invention, the union being especially constructed to provide a double sealing effect.
Figure 4:
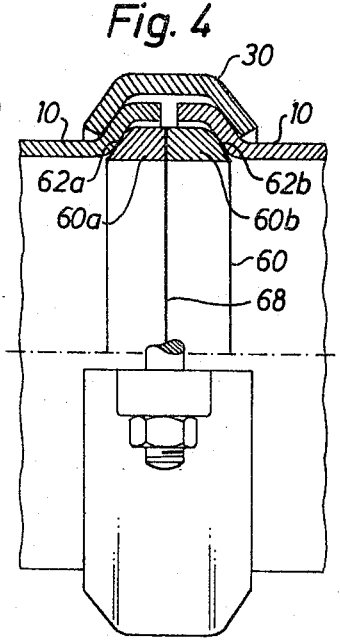
FIG. 4 is a longitudinal sectional view substantially corresponding to that of FIG. 3 but illustrating a second embodiment of the invention requiring but small space when being assembled to the pipes.
Figure 5:
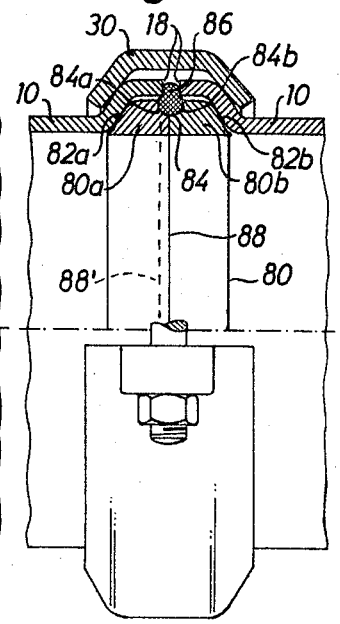

FIG. 5 is a longitudinal sectional view through an embodiment of the invention comprising a combination of the embodiments shown in FIGS. 3 and 4; and FIGS. 6–8 illustrate diagrammatically and in perspective the advantages afforded by a disconnectible pipe union constructed in accordance with the invention, and more particularly the advantages afforded by the embodiment illustrated in FIG. 3 when connecting or inserting a hydrocyclone into a fixed system of pipes.

Figure 1:
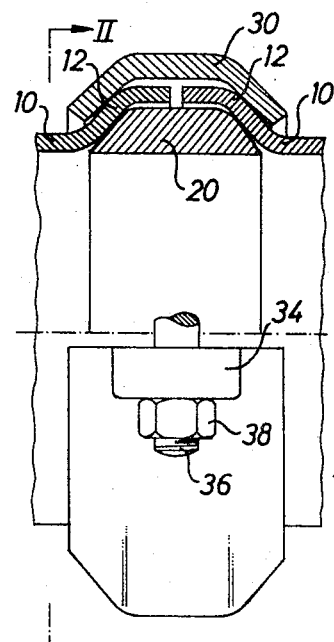
FIG. 1a is a view illustrating the elements of the union shown in FIG. 1 in a separated condition.
Figure 1A:
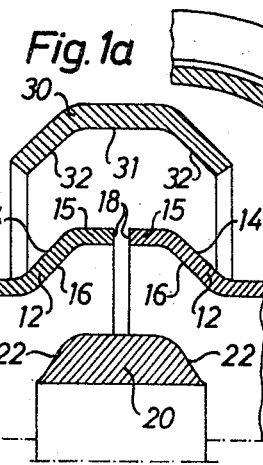
Figure 2:
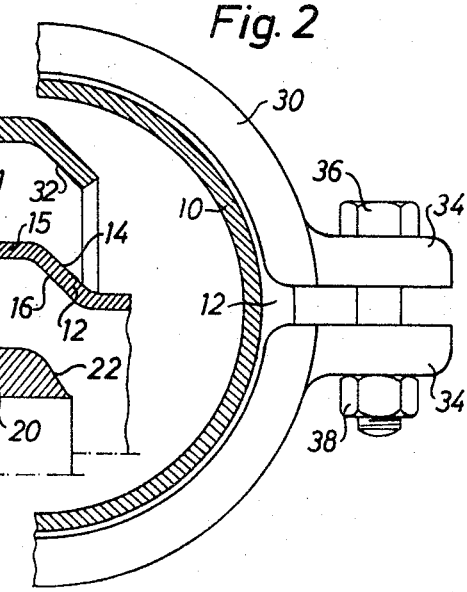
FIG. 2 is a fragmentary cross sectional view of the same union viewed from the plane indicated by the line II—II in FIG. 1.

In order that the invention be more readily understood, there is illustrated in FIGS. 1, 1a and 2 an embodiment of a disconnectible pipe union of the type described in my earlier U.S. Pat. application. Two pipes 10 to be joined together are provided at the ends thereof with collars 12, which are flared towards each other such that each collar forms an angle of inclination of the order of 40°–60° with the longitudinal axis of the collar, as evident from the drawing. Two part annular sections in the form of clamp members 30 are arranged around the collars 12, the inner surfaces of the clamp members having a groove, the bottom 31 of which (FIG. 1a) is straight, while the walls 32 of the groove slope away from each other at an angle corresponding to the flank angle of the collars 12. The two clamp members 30 are provided with opposing lugs 34 intended to form with screws or nuts 36, 38 a screw joint, by means of which the clamp members can be drawn together, whereby the collars 12 will be urged against each other by a wedging or camming action as the clamp members 30 with their inclined inner surfaces 32 engage the outer flanks 14 inclined substantially at the same angle, as will be evident from FIGS. 1 and 1a.

The inner flanks 16 of the collars, having substantially the same angle of the inclination as the corresponding external collar surfaces 14, are arranged to engage a sealing ring 20 disposed between the collars, the side edge surfaces 22 of the ring 20 being bevelled, and preferably slightly rounded at an angle corresponding to the inclination of the inner flanks 16 of the collars 12. When the collars are moved together as the clamp is tightened, the inclined surfaces 22 of the sealing ring 20 will thus slide towards the inner collar flanks 16. Hereby the ring is contracted by the wedging or camming effect to which it is subjected, this effect being uniformly dispersed around the circumference of the ring 20.

The ring is made of a stiff or rigid, but elastically resilient material, preferably a plastics material such as nylon or Teflon, and will thus be subjected to elastic deformation radially inwardly, owing to the fact that its side edges 22 are actuated by the inner surfaces 16 of the collars 12 on the pipe ends 10, as aforedescribed. In this way there is obtained a sealing engagement between the sealing ring and the internal collar flanks, the elastic ring adjusting itself to possible irregularities in the flank surfaces during the small sliding movement occurring between said ring and said flank surfaces as the union is tightened, the ring also adjusting itself Jo small degrees of misalignment between the opposed pipe collars.

There are two principal features of the structural design of such a pipe union which should be observed. First, the sealing ring 20 is made of a rigid, but resilient material and lies substantially freely between the coacting pipe collars. Thus, the ring does not comprise any of the more conventional soft and more less plastic materials, such as rubber, which fullfil their sealing effect by plastically filling and sealing a space, for example, between pipe flanges. Secondly, the collars or flanges located at the ends of the pipes to be joined need not necessarily present straight flank surfaces, i.e., the generatrices of the frusto-conical surfaces formed by the outer and inner flanks 14 and 16, respectively, of the pipe collars 12 need not be straight lines. As will be readily acknowledged by the man of the art, if the end of a pipe, for example, a thin-walled metal pipe, such as a steel pipe, for example, is flared or provided with specially manufactured collars attached to said pipe as by welding, great difficulty is experienced in providing straight and smoothed surfaces by plastically deforming the tubular material by means of appropriate tools; the material in practice bending outward slightly and it may be expected in some cases that both the outer and inner flank surfaces of the pipe collars present, when viewed in cross section, a flat S-shape with rounded junctions between the cylindrical portion of the pipe 10 and the outer cylindrical portion 15 of the pipe collar 12, as will be evident from FIG. 1a. It should be noted, however, that this cylindrical portion 15 may be extremely narrow and almost negligible.

As indicated above, the inclined surfaces 22 of the sealing ring 20 may be convexedly rounded, the shape of the ring constantly being adjusted so that contact between said ring and the collar flanks is obtained along a line or a narrow circular region, i.e., when the clamping ring is tightened and the pipe collars are forced together while engaging the sealing ring, the sealing contact is obtained along a narrow band extending peripherally of the union under a very high surface pressure, thereby ensuring the desired sealing effect.

In those instances when the medium conveyed or located in the pipe 10 is under gauge pressure, i.e. a pressure exceeding the pressure externally of the pipe, the pressure exerted by the medium on the inside of the sealing ring 20 will amplify the sealing effect, i.e., the inclined sides of the ring will be urged more strongly against the internal flanking surfaces 16 of the pipe collars 12. The opposite is true when the medium in the pipe is under a vacuum or a pressure which is lower than the surrounding pressure, since the seal amplifying effect is removed and the ambient medium, e.g., atmospheric air, attempts to penetrate beyond the sealing ring 20. In this respect, a complete sealing effect can be ensured by modifying the pipe union in the manner of the present invention as illustrated in FIG. 3. As will be seen from this Figure, the modification involves providing a sealing ring 40, substantially corresponding to the sealing ring 20 and forming part of a pipe union of otherwise identical construction as that illustrated in FIGS. 1 and 2, with a central peripherally extending groove 44 having a semi-circular or part-circular cross sectional configuration. A conventional elastomeric O-ring 46 is placed in the groove 44. When the clamp members 30 are tightened together, by means of the screw joints 36, 38 (FIG. 2), the internal, inclined flanking surfaces 16 of the pipe collars 12 will engage the correspondingly inclined outer surfaces 42 of the sealing ring 40, in the aforementioned manner, while sealingly engaging therewith. At the same time, however, the free, opposing edge surfaces 18 of the pipe collars will engage the O-ring 46 located in the groove 44 of the sealing ring 40, as clearly shown in FIG. 3, thereby providing a further sealing effect, which is particularly effective against the penetration of ambient air into the pipe.

Obviously, in order to connect or disconnect two pipe ends by means of the unions shown in FIGS. 1, 2 and 3, it must be possible to pull or push the ends of the pipes apart through a distance corresponding to the thickness or width of the sealing ring 20 or 40, so that the ring can be inserted between the pipe ends or removed therefrom. In the majority of cases, this presents no problem, although when the pipes to be joined form part of a fixed system of pipes, difficulty can be had in moving the pipes sufficiently apart to enable insertion or removal of the ring between or from the collars. As is well known, although the pipes of a fixed pipe system are located against axial movement, there is always a certain degree of inherent elasticity in the pipes and it is practically always possible to force the pipe ends apart at least to a slight extent, although it is not always possible to move the ends of the pipes apart to the extent required to insert or remove a sealing ring of the width of that used with the embodiments of FIGS. 1–3. With the embodiment of the pipe clamp illustrated in FIG. 4, on the other hand, it is only necessary to move the pipe ends apart through half the distance required with the unions of the preceding embodiments. As will be seen from FIG. 4, the union of this embodiment comprises a sealing ring 60 divided into two identical, symmetrical halves 60a and 60b. The ring halves abut each other along a dividing plane 68, and when the clamping ring of the union is tightened to bring the internal flanking surfaces 16 of the pipe collars 12 into engagement with the ring 60 to compress and contract the same, the halves 60a and 60b are urged towards each other along the dividing plane 68, to provide an efficient and full seal. As will be seen from the figure, assembly and disassembly of the divided sealing ring 60 can be effected by moving the pipe collars apart through a distance corresponding to the width of one of the ring halves 60a or 60b, so that one ring half at a time can be introduced into or removed from the gap between the pipe ends, that is to say, between the edges 18 of the pipe collars 12.

In those instances where it is desired to seal against a vacuum in the pipe and where the space will not permit the assembly of an undivided sealing ring, the embodiments of FIGS. 3 and 4 can be combined. This combined embodiment is illustrated in FIG. 5. With this latter embodiment, the sealing ring 80 comprises two symmetrical halves 80a and 80b having a common dividing plane 88. In the common outer surface of the ring halves there is disposed a central groove 84, corresponding to the groove 44 in the undivided sealing ring 40 of FIG. 3. With the embodiment of FIG. 5, the groove is formed by identical parts 84a and 84b in the sealing ring halves 80a and 80b, respectively. An O-ring 86 is arranged in the groove 84 and when the union is tightened, the O-ring serves to seal against medium attempting to penetrate from without, as a result of its engagement with the two opposing pipe edges 18 and, in addition, the seal at the dividing plane 88 between the ring halves is amplified. Also, unsymmetrical dividing is possible (plane 88').

A particularly valuable feature of the pipe union of the present invention is its aforementioned ability to self-adjustment, thereby substantially eliminating the requirement of co-axial alignment of the opposing tube ends. At the same time, the requirement of a smooth and uniform surface finish of the opposing surfaces of the pipe collars is also substantially eliminated, which is to great advantage since, as previously indicated, such collars are usually formed on the pipes by plastically deformning said pipes by means of press tools. The uneven and rough surface of the opposed collars formed by the pressing operation does not affect the sealing ability of the pipe union according to the invention, provided that such irregularities lie within reasonable limits. When the two pipe collars forming part of the pipe union according to the invention are drawn towards each other by the surrounding segmented clamping ring, the intermediate, rigid but elastic sealing ring adjusts itself to the conditions existing between the pipe ends, thus to any slight deviation in alignment between the collars and to a certain degree of uneveness in their internal flanking surfaces. Thus, the ring is twisted slightly and departs somewhat from its pure circular shape to abut the collar flanking surfaces over the entire extent thereof. Further, as a result of the narrow width of the annular contact surfaces or contact band, with accompanying higher surface pressure, the ring material will fill out all the irregularities in the flanking surfaces of the collars. This self-adjusting feature of the pipe union according to the present invention is of great importance in practice, especially when the union is to be used to couple or insert elements between the ends of pipes located in different planes and extending in mutual different directions. An example of how the pipe union of the present invention can be used in this context is illustrated in FIGS. 6–8, which show the advantages afforded by the union with respect to simplicity of construction and usefulness in operation.

In the exemplary illustration of FIGS. 6–8, there is shown a hydrocyclone 100 of the type used for purifying fiber suspensions in a paper manufacturing plant. The hydrocyclone is intended to be connected in the suspension conducting pipe system, and to this end it is provided with an inlet connecting pipe 102 and an outlet connecting pipe 104. The ends of the connecting pipes are flared into collars 112 (FIG. 6) intended to form part of a pipe union according to the invention and corresponding to the previously described pipe collars 12. At the top of FIG. 7 there is illustrated a portion 110 of the pipe to which the outlet connecting pipe 104 is to be joined, said pipe portion being terminated with the same form of collar 112, which may be produced separately and joined to the pipe portion 110 as by welding, for example. In view of the fact that the pressure in the conduit system at times falls below the pressure of the surrounding air, the union used to couple the pipes is the one illustrated in FIG. 3, thus comprising a sealing ring 40 having an O-ring 46, two outer clamp members 30 with lugs 34 and two screws 36 co-operating with nuts 38. The collars 112 are brought together with the sealing ring 40 disposed between the inner surfaces of the collars, and the clamp members 30 with associated screw joints are mounted in the aforedescribed manner. At the same time, the inlet connecting pipe 102 is coupled to a co-acting (not shown) pipe end and the same coupling elements (not shown) as those illustrated in FIG. 7 are used to join the pipes. The outlet connecting pipe 104 with the union in position is illustrated in FIG. 8, and it should be observed that the geometric center axes of the two connecting pipes 102 and 104 are substantially at right angles to each other and laterally displaced in different planes. This means that the pipe ends forming part of the fixed pipe system, of which ends one is shown at 110, are located correspondingly displaced in space, and it would present great difficulties in orienting the pipe ends with any degree of accuracy so as to fit the connecting pipes of the hydrocyclone exactly thereagainst. For example, should the cyclone be connected to the pipes by means of conventional flange joints, where planar flanges in the fixed system of pipes are intended to fit against corresponding planar flanges on the connecting pipes of the cyclone, great difficulty would be had in fitting the flanges together and it would be practically impossible to avoid high permanent stresses and deformation when tightening the joint. This is also true when the pipes are joined by means of co-acting screw-on sleeves or similar jointing systems. As a matter of fact, in order to overcome the requirement of accurate alignment between the pipe ends or the occurrence of internal stresses, there are used in most cases simple hose connectors — short pieces of hose pushed over the meeting pipe ends and fixed with hose clips or the like. This solution, however, is rather primitive and does not afford a technically satisfactory solution. By means of the pipe union of the present invention, however, the pipes can be connected with particularly moderate requirement of the mutual alignment of the fixed pipe ends. In addition the coupling can be effected rapidly and the clamp is particularly inexpensive to manufacture.

Although the invention has been described with reference to a number of embodiments thereof, it will be readily perceived that the invention is not restricted to such embodiments but can be modified within the scope of the accompanying claims. For example, the inventive concept provides those of normal skill in the art wide possibilities in adapting the proposed pipe union in accordance with changing conditions.

The embodiments of the invention in which I claim an exclusive property or privilege are defined as follows:

1. A disconnectible pipe union, comprising a pair of annular collars one on each of the pipe ends to be joined, said collars being flared so as to increase in diameter in a direction towards the medial plane of the joint to form an inwardly facing front face and an outwardly facing back face, each said collar terminating in an outer edge portion having a relatively sharp corner, the sharp corners on said pair of collars substantially confronting one another, a segmented clamping ring having a groove on the radially inner face thereof the sidewalls of which groove converge at an angle corresponding to the angle of convergence of the back faces and engage said back faces, means for tightening said clamping ring, whereby when said clamping ring is tightened, the groove side walls subject the back faces of the collars to a camming action which urges the pipe ends axially towards each other and brings the outer edge portions of the collars near one another, a stiff but resilient primary sealing ring disposed between the front faces of the two collars, said primary sealing ring having a cross sectional shape so as to substantially occupy and fill the axial space defined between said front faces to engage each front face along a circumferential line contact area thereby to provide a narrow sealing contact zone between each side face of the sealing ring and each of said front faces, the side faces of the primary sealing ring extending at an angle relative to one another whereby the primary sealing ring is subjected to both axial and radial compression when the collars are sealingly clamped thereagainst by the clamping ring, the primary sealing ring being provided with a central peripherally extending outwardly opening groove on the outer peripheral surface thereof, and a secondary sealing ring of elastomeric material seated within said groove and having a part thereof projecting outwardly from said groove such that said part sealingly engages both said outer edge portions of the collars, said clamping ring causing the opposed sharp corners to project into the projecting part of said secondary sealing ring on opposite sides thereof, whereby the projecting part of the secondary sealing ring is deformed so as to extend into the space between and sealingly engage the opposed outer edge portions of the collars.

2. A pipe union according to claim 1, wherein the primary sealing ring is divided into two ringlike sections which sealingly abut one another along a dividing plane which intersects said peripherally extending groove.

3. A pipe union according to claim 1, wherein the side faces of the sealing ring have a rounded convex configuration so as to sealingly engage the respective front face along only said narrow circumferential sealing contact zone.

4. A pipe union according to claim 1, wherein each said collar includes a conical portion which flares radially outwardly and defines said front face on the inner surface thereof disposed for sealing engagement with the side face of the primary sealing ring, each collar also including an axially extending annular portion fixedly connected to the outer end of said flared portion and projecting axially therefrom, said axially extending portion being of substantially uniform diameter and defining at the free end thereof said outer edge portion having said relatively sharp corner.

* * * * *